United States Patent Office 2,895,911
Patented July 21, 1959

2,895,911

DRILLING FLUID

Orien W. Van Dyke, Houston, Tex., assignor to Magnet Cove Barium Corporation, Houston, Tex.

No Drawing. Application March 17, 1958
Serial No. 721,679

12 Claims. (Cl. 252—8.5)

This invention relates to fluids of the general character commonly known as drilling mud or drilling fluid. Most commonly drilling mud is used in the actual drilling operation but it has certain other functions as will hereinafter be described. Although having many similar characteristics and some functions in common with that type of drilling fluid customarily used in the actual operation of drilling wells, the drilling mud or fluid to which this invention relates has for its primary purpose the control of high pressures present in many wells, and its utility as a fluid actually used in the drilling operation is likely to be limited.

The highest drilling mud weights that have been obtainable in the past have been in the range of 22 to 24 pounds per gallon. With the methods and materials disclosed in this invention, mud weights in the range of 26 to 32 pounds per gallon have been made and successfully tested in the field. It is not uncommon for emergency situations to develop in the field due to equipment failures and other causes, in which situations very high formation pressures must be controlled but in which the circumstances prevent the use of more than a relatively short column of mud. Mud weights in the range of 26 to 32 pounds per gallon allow the control of high formation pressure with a column height of approximately two-thirds that required with conventional muds of the past. Blowouts and wild wells are extremely hazardous to life, well equipment and surrounding property as well as a tremendous waste of a natural resource. This invention provides a tool which has not previously been available for the operator to use in the correction and control of emergency high pressure situations in wells. This added insurance against dangerous and costly blowouts is extremely important to the oil industry.

In one of its aspects this invention contemplates the provision of a new composition for use as a drilling fluid. In another aspect, it contemplates the use, primarily for the purpose of making unusually heavy drilling fluids, of a novel solid weighting material for such fluids, which material is not only exceptionally well adapted to its purpose but sufficiently plentiful and presently inexpensive compared with other materials available for this purpose. In another of its aspects this invention contemplates a proportioning and distribution of particle sizes of the various components of a drilling fluid so as to make possible the formulation of heavier fluids than otherwise, particularly in the use of the novel weighting material above mentioned, and also in improving the results of use of other weighting materials.

In the course of drilling wells by the rotary drilling method, a drilling fluid is pumped into the well, usually in through the drill pipe and out through the annular passageway around the drill pipe. Such fluid has numerous functions during the drilling operation, such as the washing of cuttings from the bottom of the well to the surface, the lubrication of the drill pipe and bit within the well to permit them to rotate more freely, and the provision of a column of fluid that exerts hydrostatic pressure sufficient to overcome pressures from formations which are likely to be encountered. At times it has been found necessary to provide muds or fluids which, for the purpose of controlling excessively high formation pressures, have weighed upwards of 15 pounds per gallon. Occasionally fluids even in excess of 18 pounds per gallon have been employed. The usual components for such muds are water, a gel-forming material such as clays of the nature of bentonite, an organic colloid such as sodium carboxyl methyl cellulose, hereinafter called sodium CMC, which controls the filtration properties to retard the loss of water from the fluid into earth formation; and a weighting material, usually very finely divided in order that its particles might be readily suspended by the gel formed by the bentonite.

In making such fluids, various weighting materials have, in the past, been employed. Perhaps the most widely used has been barium sulphate, otherwise called barite or barytes. The usual specifications for barium sulphate for this purpose require that it be ground to a fineness such that 95 percent will pass through a 325 mesh screen. Having a specific gravity of somewhat less than 4.4, commercial barite has been successfully used in making fluids weighing as much as 21 or 22 pounds per gallon and has proved highly satisfactory as a drilling mud-weight material for muds of 18 pounds per gallon and lighter.

However, instances have arisen in which there has been great need for fluids weighing in excess of 22 pounds per gallon. These instances arise where an insufficient vertical distance in the well is available to accommodate a column of the heaviest available fluid high enough to overcome the well pressures involved. For this reason it has been impossible heretofore to deal with this condition by controlling the well pressure with a column of fluid. The methods and materials disclosed in this invention are the first to teach a way of preparing practical and useable fluids having a weight in the range of 26 to 32 pounds per gallon. The extremely high weight muds made available through this invention make possible the control of formation pressures with 32 per cent less column height than with the heaviest muds available in the past.

By way of example of the need for extremely heavy fluids, one well had been drilled to a depth of 12,160 feet and had 9⅝" casing set at 10,020 feet. While drilling at this depth a high-pressure gas was encountered which resulted in sticking of the drill pipe. The drill pipe was unthreaded at 9950 feet and the upper section removed. Subsequently the well blew out from the formation located at the bottom, and the pressure blew into an upper formation through a rupture in the casing at 4125 feet. It was necessary, in order to control the pressure, to use a fluid sufficiently heavy so that a column extending from the 4125 foot level to the 9950 foot level or slightly less than 6000 feet in height would provide sufficient hydrostatic pressure to overcome the extremely high formation pressure at the bottom of the well. This was because effectively the top of the well was at the 4125 foot point where the casing leak occurred.

It was impossible to determine the exact pressure of the formation from which the blowout occurred but attempts to kill the well with a 20 pound per gallon mud were unsuccessful. Using the method of this invention, an experimental batch of 28 pounds per gallon mud was formulated using galena as the weighting material. This was tried using 350 barrels of the 28 pounds per gallon mud, and the well was thereby successfully brought under control.

It was found, by this test, that despite the large percentage of volume of solids, the high viscosity, and the unknown characteristics of galena under the high temperature and pressure conditions and in the presence of the other ingredients and components present in the well, no deleterious changes in the characteristics of the fluid, such as dehydration, solidification, or gas cutting appeared to take place in the well.

In order to make drilling fluid weighing in the range of 26 to 32 pounds per gallon, it is necessary to use some substance with a greater specific gravity than barium sulphate. It is also required that the material be substantially inert chemically to the usual substances found in fluids in wells under the temperature and pressure conditions prevailing therein, and that it be sufficiently plentiful in supply. As a practical matter, it is necessary that it be available at a sufficiently low cost to render it economically feasible.

The use of galena was suggested by Henry Emmett Gross, Assistant Professor of Petroleum Engineering at the University of Oklahoma, in October 1937, in an American Institute of Mining and Metallurgical Engineers paper entitled "Intensive Weighting of Petroleum Drilling Muds With Galena." This paper suggests the use of galena with barite, galena with hematite, and galena with bentonite. However, the data in this paper show that attempts to make fluids heavier than 21.9 pounds per gallon by the methods therein disclosed resulted in a fluid that was too viscous to handle. Furthermore, the cost of galena is very high by comparison with ordinarily-used weighting materials, and it is highly desirable that a suitable lower-priced material be provided.

I have discovered that a highly suitable material for this purpose is a material known as "Speiss," which is a mixture of impure metallic arsenides produced as a regulus in smelting certain ores. The Speiss found most suitable is composed principally of iron and arsenopyrite as its active ingredients, being made up of somewhat in excess of 80 percent of such materials. One suitable example, from the Bunker Hill Smelter, at Kellogg, Idaho, upon analysis, showed iron 57.6%, arsenic 33.6%, tin 2.1%, lead 2.8%, copper 2.7%, silver 4.02 ounces per ton and gold .005 ounce per ton. It had a specific gravity which varies from sample to sample between 6.9 and 7.2. Another sample of suitable Speiss, from Palisade, Nevada, showed iron 61.1%, lead 2.7%, copper, a trace, and most of the remainder arsenic. Specific gravity was 7.03. Unlike most drilling mud ingredients, both examples were magnetic, hard and brittle. However, both could be satisfactorily ground with commercial equipment, and although the particles appeared to be rough and jagged, this does not interfere with their suspension in accordance with this invention.

Speiss, if ground to a fineness such as usually specified for commercial barite cannot be suspended in an aqueous medium in sufficient concentration to make a mud of the desired weight without becoming so viscous that it is not pumpable. However, I have discovered that by properly proportioning and distributing the particle sizes of the constituents, a fluid of the desired weight can be formulated using such Speiss as a weighting material and suspending it in an aqueous medium with a gel-forming material such as bentonite, and suitable quantities of an organic colloid, such as the commercial form of sodium CMC. Despite its high specific gravity and magnetic properties, Speiss can be suspended by the method of this invention so that it will not settle out. Not only can it be suspended, but it can be suspended in sufficient concentration to give to the fluid a weight of as much as 32 pounds per gallon without rendering it too viscous to be pumpable.

In order to keep as low as possible the volume of solids as compared to the liquid in the mixture, a quantity of bentonite less than sufficient to suspend the entire quantity of weighting material to be used is employed, and there is also employed a quantity of organic colloid such as sodium CMC sufficient to give the fluid desired low filtration properties and initial viscosity. I have discovered that if the weighting material, instead of being ground as customarily specified for barite, is ground in a commercial Raymond mill, or its equivalent, only to such a degree that a percentage within the range of 55 to 85 percent will pass through a 325 mesh screen, the particle size distribution will be such as to make possible the suspension of sufficient Speiss to make muds in the range of 26 to 32 pounds per gallon.

The exact reason for the action above-described is not known. However, it is believed that Speiss so ground contains such a quantity of extreme fines as may be readily suspended by the bentonite and organic colloid and serves to increase the suspension characteristics of the fluid to such a degree that the remainder of the weighting material, which is of larger particle size will be suspended in the fluid. At the same time the amount of such extreme fines in the mixture ground as specified is not so great that, even 32 pound per gallon fluids made in this fashion are rendered so viscous as to be unpumpable. Also, such fluids may be treated with the usual viscosity-reducing agents, such as sodium acid pyrophosphate and sodium tetraphosphate, to reduce their viscosity.

Careful laboratory testing has shown that even after being subjected to temperatures of the order customarily encountered in wells for a considerable period of time, these fluids may be treated with such treating materials to reduce or maintain their viscosities within pumpable limits.

It is to be understood that grinding in a Raymond mill is not essential but that grinding by any other means may be employed so long as the particle size distribution in the finished ground product is substantially that of the material ground in the Raymond mill as specified.

The regulation of particle size distribution, as above outlined, also makes possible the making of much heavier muds with galena than can be made without such regulation. However, from an economic standpoint, Speiss is more suitable than galena, and can be presently obtained at a much lower cost than galena.

It is noted at this point that various other substances were found unsuitable. For example, certain flotation concentrates of galena were found unsuitable because their use resulted in fluids too viscous to handle in the desired weight ranges. Certain table concentrates of galena were also found to be unsuitable, although jig concentrates were found suitable. The reason that certain flotation and table concentrates were found to be unsuitable was that they were impure, i.e. contained excessive amounts of low gravity solids. The latter unduly added to the viscosity without contributing to the weight of the mud in the same proportion as pure galena. It has been found that satisfactory galena concentrates are those having a specific gravity of at least 6.5. Pure galena (lead sulfide) has a specific gravity in the range of 7.4 to 7.7 and, of course, the nearer the galena concentrate approaches this gravity range, the heavier the mud can be made while maintaining a desired viscosity. The term "galena concentrate" will be used herein to mean not only galena concentrates as such but also pure galena per se. The difference between pure galena (PbS) and a galena concentrate is that the latter contains impurities (e.g. low gravity solids such as other minerals) which reduce the specific gravity of the concentrate to be less than that of galena per se.

In these special high-weight muds, there must be a sufficient quantity of low-gravity gel-forming solids for support of the weighting material. At the same time such low solids must be kept to a low enough percentage so that, taken with the weighting material fines they will not cause the viscosity of the resulting mud to be too great for pumpability. It has been found that a very suitable formulation results from the employment of 6 pounds of bentonite per final barrel of mud, this being satisfactory for making muds over a weight range of 26 to 32 pounds per gallon. Of course, the heavier the final mud is to be, the more weight material must be incorporated in each barrel, and hence, the heavier the mud, the smaller the amount of water that will go into the make-up of each barrel. Contrariwise, for the lower weights of mud more water will be employed and less weighting material.

Likewise, the optimum particle size proportioning in the weight material itself has been found to be that existing in a Speiss ground in a commercial Raymond mill until 70 percent thereof is of a fineness which will pass through a 325 mesh screen.

A series of mud samples was made up for the purpose of determining the effect of increasing or decreasing the percentage of weight material ground to a fineness which would pass through a 325 mesh screen. In all of these samples a base formula was employed containing 0.566 barrel of water per barrel of final fluid, together with 6 pounds of bentonite, 1½ pounds of organic colloid and 1 pound of sodium acid pyrophosphate. 1060 pounds of Speiss per final barrel was employed in each case.

In making the first of these samples the Speiss employed was ground in a commercial Raymond mill so that approximately 70 percent of the total amount of Speiss employed would pass through a 325 mesh screen. This produced a mud weighing 30.6 pounds per gallon and having a Stormer viscosity of 525 centipoises.

Another sample was then prepared using Speiss which had been ground in a Raymond mill until the percentage of material which would pass through a 325 mesh screen was 85 percent of the total amount of weighting material employed. With this grind a mud was produced weighing 30.2 pounds per gallon but the viscosity had increased to 975 centipoises, which is the approximate limit of pumpability, indicating that for muds of a comparable weight the fines of the weighting material which will pass through a 325 mesh screen should not exceed 85 percent of the total weight material.

Going in the opposite direction, it was found that when the Speiss was ground in the Raymond mill only until the percentage of weight material that would pass through a 325 mesh screen was 55 percent, the mud produced weighed 30.5 pounds per gallon and the viscosity was satisfactory at 385 centipoises but that some settling of the weighting material occurred. It was therefore considered that for muds of comparable weight the percentage of weight material which would pass through a 325 mesh screen should be at least as great as 55 percent, this representing the lower limit of the percentage of such material in the total weighting material employed. Thus the range is such that the Speiss shall have a particle size distribution substantially as produced by grinding in a commercial Raymond mill until the percentage of the grind which will pass a 325 mesh screen is in the range of 55 to 85 percent, the balance being retained on the 325 mesh screen. This same range applies to galena concentrates.

In a study to determine the effect on viscosity of variations in the amount of gel-forming material and variations in the amount of organic colloid employed, a mud was made up containing 6 pounds of bentonite per final barrel and 1½ pounds of sodium CMC per final barrel, 0.566 barrel of water, and 1060 pounds per final barrel of Speiss having the particle-size proportion outlined above as the optimum. One pound of sodium acid pyrophosphate was added. This resulted in a mud having a weight of 30.6 pounds per gallon and a Stormer viscosity of 525 centipoises.

Another sample was then made up using 15 pounds of bentonite per final barrel and ½ pound of sodium CMC per final barrel with the same amounts of water and weight material as before. This resulted in a mud having a weight of 31.1 pounds per gallon but, even though two pounds of sodium acid pyrophosphate per barrel were used, the viscosity reached 975 centipoises, which is about the limit of pumpability. It was thus considered that for a mud weight in the range of 30 to 31 pounds per gallon the maximum ratio of bentonite to cellulose permissible was 15 pounds of bentonite per final barrel and ½ pound organic colloid per final barrel.

Another sample of mud was made up using 3 pounds each of bentonite and sodium CMC per final barrel, together with 0.566 barrel of water and 1060 pounds of weight material. One pound of sodium acid pyrophosphate per barrel was used. This resulted in mud weighing 30.6 pounds per gallon and having a Stormer viscosity of 825 centipoises, which is within the pumpable range but approaching the upper limit thereof. The result of this sample was to show that the quantity of organic colloid may be increased to 3 pounds per final barrel, provided the quantity of bentonite is reduced to 3 pounds per barrel, and still produce a pumpable mud weighing slightly over 30 pounds per gallon.

Still another mud was made up containing 15 pounds of bentonite per final barrel with ½ pound of sodium CMC but using 0.685 barrel of water and only 768 pounds per final barrel of weighting material. Again one pound of sodium acid pyrophosphate was used. This produced a mud weighing 24.6 pounds per gallon and having a viscosity of 350 centipoises. This illustrates that 15 pounds of bentonite per final barrel can be used in formulating a mud in the 24 to 25 pound range which has entirely satisfactory viscosity characteristics, even though a mud containing the same amount of bentonite and weighing 31.1 pounds per gallon had a viscosity which was substantially at or above the upper limit of pumpability.

A mud sample was prepared employing 3 pounds of bentonite per final barrel and an equal amount of sodium CMC, together with 0.525 barrel of water, 1157 pounds of weighting material and one pound of sodium acid pyrophosphate. This mud weighed 32.6 pounds per gallon and had a Stormer viscosity of 975 centipoises, which is barely within the pumpable range.

From the foregoing it may be reasonably concluded that the practical limits of composition in regard to gel-forming material and organic colloid to be employed in making mud in accordance with this invention should be between 15 pounds and 3 pounds of gel-forming material per final barrel and between 3 pounds and ½ pound of organic colloid per final barrel. None of the muds formulated in this study with regard to permissible ranges of gel-forming material and organic colloid showed settling. These ranges were found to apply not only to Speiss but also to galena concentrates.

The following Table I shows typical preferred formulations of muds in the weight range to which this invention primarily applies, together with the critical characteristics thereof.

TABLE I

*Typical preferred formulation for high weight muds*

AMOUNTS REQUIRED FOR ONE BARREL FINAL MUD

| | | | | |
|---|---|---|---|---|
| Mud weight, lb./gal | 26 | 28 | 30 | 32 |
| Water, bbl | 0.65 | 0.61 | 0.566 | 0.53 |
| Bentonite, lb | 8.0 | 6.0 | 4.0 | 4.0 |
| Sodium Carboxyl Methyl Cellulose, lb | 1.5 | 1.5 | 1.5 | 1.0 |
| Sodium Acid Pyrophosphate, lb | 0.5 | 0.5 | 0 | 0.5 |
| Speiss, lb | 868 | 965 | 1,060 | 1,157 |

TYPICAL PROPERTIES AFTER AGING 60 HOURS AT ROOM TEMPERATURE

|  | 300 | 335 | 325 | 575 |
|---|---|---|---|---|
| Vis., cp | 300 | 335 | 325 | 575 |
| Gels, 0/10, gm | 5/80 | 10/120 | 5/85 | 5/110 |
| pH | 8.2 | 8.7 | 9.2 | 9.7 |
| Fluid loss, ml | 8.7 | 8.0 | 9.8 | 9.4 |
| Settling | none | none | none | none |
| Syneresis | none | none | none | none |

To demonstrate the effectiveness of galena concentrate (jig) a base mud of 4 pounds per barrel of bentonite and one pound per barrel of CMC was made up in water. Samples of this mud were weighted with two different galena concentrates. Each of the concentrates had been ground in a Raymond mill until approximately 70 percent would pass minus 325 mesh. The first concentrate had a specific gravity of 6.83 and a sample of the mud weighted to 30.3 pounds per gallon had a viscosity of 125 centipoises after treatment with 0.1 pound per barrel of sodium tetraphosphate. The second concentrate had a specific gravity of 6.99 and a mud weighted to 31.0 pounds per gallon had a viscosity of 225 centipoises.

A galena flotation concentrate having a specific gravity of 5.70 was also ground so that approximately 70 percent passed a minus 325 mesh. A sample of mud comprising water, 2 percent by weight of bentonite, 3 pounds per barrel CMC and 0.5 pound per barrel sodium tetraphosphate had sufficient of the flotation concentrate added to weight the same to 30 pounds per gallon. The resulting weighted mud was so thick that it was plastic and would not pour.

Although this invention relates primarily to muds in the range of 26 to 32 pounds per gallon, it may have limited use in certain lower weight muds. For example, a field lime mud containing commercial barium sulphate and having a weight of 15.3 pounds per gallon with a viscosity of 60 centipoises, was used in comparing the results of increasing the weight by adding Speiss, on the one hand, as against barium sulphate, on the other. When the weight was raised to 18 pounds per gallon, the mud to which the Speiss was added had a viscosity of 95 centipoises, whereas that to which barium sulphate was added had a viscosity of 125 centipoises. At 20 pounds per gallon the Speiss mud had a viscosity of 135 centipoises, whereas the barium sulphate mud had a viscosity of 250 centipoises. When the mud weight was increased to 22 pounds per gallon, the Speiss mud had a viscosity of 195 centipoises, whereas the barium sulphate mud had a viscosity of 650 centipoises. At 24 pounds per gallon, the Speiss mud had a viscosity of 300 centipoises, while the barium sulphate mud had acquired a viscosity in excess of 975 centipoises and was unpumpable. Thereafter more Speiss was added to the Speiss mud to raise its weight to 26 pounds per gallon, at which point its viscosity was 500 centipoises. It was not until Speiss was added to the point of raising its weight to 28 pounds per gallon that its viscosity increased to in excess of 975 centipoises. Even after that point had been reached, it was possible to treat the mud with a lignosulphonate, sold commercially for that purpose, and reduce its viscosity to 625 centipoises. This series of tests showed not only the superiority of Speiss as a weighting material in the higher ranges of weights of mud used for drilling but also its compatibility with a field lime mud.

While this invention is not limited to any specific order of mixing of the ingredients of the mud, it has been found most advantageous, in mixing this mud in the field, to add all of the bentonite or gel-forming material and all of the organic colloid to one-half of the water which is to be used, thereby making a viscous slurry. Thereafter, the weighting material is added while circulating the slurry through a conventional jet-hopper mixer into a mixing tank. As mixing proceeds, water is added to keep the fluid pumpable, and during the latter stages of the mixing, viscosity-reducing materials, such as sodium acid pyrophosphate, are added to reduce the viscosity. The reason for following this procedure is to keep the viscosity of the fluid high so as to prevent the settling of the weighting material during the mixing, because the weighting material to which this invention principally relates ordinarily has a specific gravity in the neighborhood of 7.0, and a particle size relatively somewhat larger than usual for weighting materials.

From the foregoing it will be apparent that by this invention there has been provided a novel heavy fluid composition, a novel method of producing it, and a novel weighting material constituent for use in fluids commonly known as drilling fluids. This weighting material is especially suitable in its many characteristics for such use, unexpectedly so in the light of past unsuccessful attempts to formulate fluids in the weight range of 26 to 32 pounds per gallon. It is also apparent that such material is highly economical due to its present low price and that by its use pumpable muds can be made having weights as high as 32 pounds per gallon. It will be further apparent that by this invention there has been provided a mud composition employing particle sizes and proportions thereof, such as make possible the formulation of heavier muds than otherwise attainable.

This application is a continuation-in-part of my co-pending application Serial No. 545,780, filed November 8, 1955, now abandoned.

Other advantages than those herein enumerated will be apparent from the practice of this invention, and it is to be understood that this description of the invention is by way of illustration and example only.

The invention having been described, what is claimed is:

1. A water-base mud for use in well operations comprising an aqueous fluid mixture containing dispersed gel-forming material of colloidal-particle size and a suspended quantity of Speiss, said Speiss having a particle size range and distribution substantially as produced by grinding in a commercial Raymond mill until the percentage of the grind which will pass a 325 mesh screen is in the range of 55% to 85%, the balance being retained on a 325 mesh screen.

2. A water-base mud for use in well operations comprising an aqueous fluid mixture, each barrel thereof containing from 15 to 3 pounds of a dispersed gel-forming material of colloidal-particle size, from 3 to ½ pound of a dispersed organic colloidal material capable of providing an initial viscosity, sufficient Speiss to impart to the fluid a weight in the range of approximately 26 pounds per gallon to approximately 32 pounds per gallon, said Speiss having a particle size distribution substantially that resulting from grinding in a commercial Raymond mill until between 55% and 85% thereof will pass through a 325 mesh screen with the balance being retained on said screen.

3. A water-base mud for use in well operations comprising an aqueous fluid mixture containing dispersed bentonite in an amount of from 15 to 3 pounds per barrel of the fluid mixture, sodium carboxyl-methyl-cellulose in the amount of 3 to ½ pound per barrel, sufficient Speiss to impart to said fluid a weight in the range of approximately 26 pounds per gallon to approximately 32 pounds per gallon, said Speiss having a particle size distribution substantially that resulting from grinding in a commercial Raymond mill until between 55% and 85% thereof will pass through a 325 mesh screen with the balance being retained on said screen.

4. The method of mixing a well fluid comprising a gel-forming material, an organic colloid, and Speiss as a weighting material, said Speiss having a particle size range and distribution substantially as produced by grinding in a commercial Raymond mill until the percentage of the grind which will pass a 325 mesh screen is in the range of 55% to 85%, the balance being retained on a 325 mesh screen, which comprises mixing all of the gel-forming material and the colloid into a sufficient amount of water to completely suspend the same and to provide an excess of water sufficient to render the mixture a pumpable viscous slurry, then gradually mixing in the Speiss and adding water with the Speiss as necessary to keep the viscosity of the fluid low enough to maintain it in pumpable condition until all of the Speiss and all of the water have been added.

5. The method of mixing a heavy well fluid, having a weight of the order of 26 to 32 pounds per gallon and comprising a gel-forming material, an organic colloid, and Speiss, said Speiss having a particle size range and distribution substantially as produced by grinding in a commercial Raymond mill until the percentage of the grind which will pass a 325 mesh screen is in the range of 55% to 85%, the balance being retained on a 325 mesh screen, which comprises mixing all of the gel-forming material and colloid into approximately one-half of the amount of water to be employed, then gradually mixing in the Speiss and adding water with the Speiss as necessary to keep the viscosity of the fluid low enough to maintain it in pumpable condition until all of the Speiss and all of the water have been added.

6. The method of mixing a heavy well fluid having a weight of the order of 26 to 32 pounds per gallon and comprising a gel-forming material, an organic colloid and Speiss, said Speiss having a particle size range and distribution substantially that resulting from grinding in a commercial Raymond mill until the neighborhood of 70% thereof will pass through a 325 mesh screen with the balance being retained on said screen, mixing all of the gel-forming material and the colloid into sufficient of the water to completely suspend the same and provide an excess of water to such a degree that the mixture will be pumpable, then gradually mixing in the Speiss and adding water with the Speiss as necessary to keep the viscosity of the fluid low enough to maintain it in pumpable condition until all of the Speiss and all of the water have been added.

7. A water-base mud for use in well operations comprising an aqueous fluid mixture containing dispersed gel-forming material of colloidal-particle size and a suspended quantity of Speiss, said Speiss having a particle size range and distribution substantially as produced by grinding in a commercial Raymond mill until the percentage of the grind which will pass a 325 mesh screen is 70%, the balance being retained on a 325 mesh screen.

8. A water-base mud for use in well operations comprising an aqueous fluid mixture containing dispersed gel-forming material of colloidal-particle size and a suspended quantity of a weighting material selected from the group consisting of galena concentrate having a specific gravity of at least 6.5 and Speiss, said weighting material having a particle size range and distribution substantially as produced by grinding in a commercial Raymond mill until the percentage of the grind which will pass a 325 mesh screen is in the range of 55% to 85%, the balance being retained on a 325 mesh screen.

9. A water-base mud for use in well operations comprising an aqueous fluid mixture, each barrel thereof containing from 15 to 3 pounds of a dispersed gel-forming material of colloidal-particle size, from 3 to ½ pound of a dispersed organic colloidal material capable of providing an initial viscosity, sufficient galena concentrate having a specific gravity of at least 6.5 to impart to the fluid a weight in the range of approximately 26 pounds per gallon to approximately 32 pounds per gallon, said galena concentrate having a particle size distribution substantially that resulting from grinding in a commercial Raymond mill until between 55% and 85% thereof will pass through a 325 mesh screen with the balance being retained on said screen.

10. A water-base mud for use in well operations comprising an aqueous fluid mixture containing dispersed bentonite in an amount of from 15 to 3 pounds per barrel of the fluid mixture, sodium carboxyl-methyl-cellulose in the amount of 3 to ½ pounds per barrel, sufficient galena concentrate having a specific gravity of at least 6.5, to impart to said fluid a weight in the range of approximately 26 pounds per gallon to approximately 32 pounds per gallon, said galena concentrate having a particle size distribution substantially that resulting from grinding in a commercial Raymond mill until between 55% and 85% thereof will pass through a 325 mesh screen with the balance being retained on said screen.

11. The method of mixing a well fluid comprising a gel-forming material, an organic colloid, and a weighting material selected from the group consisting of galena concentrate having a specific gravity of at least 6.5 and Speiss, said weighting material having a particle size range and distribution substantially as produced by grinding in a commercial Raymond mill until the percentage of the grind which will pass a 325 mesh screen is in the range of 55% to 85%, the balance being retained on a 325 mesh screen, which comprises mixing all of the gel-forming material and the colloid into a sufficient amount of water to completely suspend the same and to provide an excess of water sufficient to render the mixture a pumpable viscous slurry, then gradually mixing in the said weighting material and adding water with the said weighting material as necessary to keep the viscosity of the fluid low enough to maintain it in pumpable condition until all of the said weighting material and all of the water have been added.

12. The method of mixing a heavy well fluid, having a weight of the order of 26 to 32 pounds per gallon and comprising a gel-forming material, an organic colloid, and galena concentrate having a specific gravity of at least 6.5, said galena concentrate having a particle size range and distribution substantially as produced by grinding in a commercial Raymond mill until the percentage of the grind which will pass a 325 mesh screen is in the range of 55% to 85%, the balance being retained on a 325 mesh screen, which comprises mixing all of the gel-forming material and colloid into approximately one-half of the amount of water to be employed, then gradually mixing in the galena concentrate and adding water with the galena concentrate as necessary to keep the viscosity of the fluid low enough to maintain it in pumpable condition until all of the galena concentrate and all of the water have been added.

References Cited in the file of this patent

UNITED STATES PATENTS

| | | |
|---|---|---|
| 2,276,075 | Wuensch | Mar. 10, 1942 |
| 2,393,047 | Krase | Jan. 15, 1946 |
| 2,686,593 | Vogel et al. | Aug. 17, 1954 |